US011075579B2

United States Patent
Huang et al.

(10) Patent No.: US 11,075,579 B2
(45) Date of Patent: Jul. 27, 2021

(54) SWITCHING CONVERTER, SWITCHING TIME GENERATION CIRCUIT AND SWITCHING TIME CONTROL METHOD THEREOF

(71) Applicant: Silergy Semiconductor Technology (Hangzhou) LTD, Hangzhou (CN)

(72) Inventors: Fusong Huang, Hangzhou (CN); Yonggang Fan, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/504,413

(22) Filed: Jul. 8, 2019

(65) Prior Publication Data
US 2020/0021191 A1    Jan. 16, 2020

(30) Foreign Application Priority Data
Jul. 12, 2018   (CN) .......................... 201810761243.5

(51) Int. Cl.
*H02M 3/158* (2006.01)
*H02M 3/156* (2006.01)
*H02M 1/00* (2006.01)

(52) U.S. Cl.
CPC .... *H02M 3/158* (2013.01); *H02M 2001/0025* (2013.01); *H02M 2001/0032* (2013.01); *H02M 2003/1566* (2013.01)

(58) Field of Classification Search
CPC . H02M 2001/0025; H02M 2001/0032; H02M 2003/1566; H02M 3/158
See application file for complete search history.

(56) References Cited

U.S. PATENT DOCUMENTS

| | | | |
|---|---|---|---|
| 7,471,133 B1* | 12/2008 | Moussaoui | H03K 7/08 327/172 |
| 8,581,518 B2 | 11/2013 | Kuang et al. | |
| 2003/0006650 A1* | 1/2003 | Tang | G06F 1/26 307/43 |
| 2003/0173941 A1* | 9/2003 | Harris | H02M 3/156 323/282 |
| 2011/0127925 A1 | 6/2011 | Huang et al. | |
| 2011/0210707 A1* | 9/2011 | Marsili | H02M 3/158 323/271 |
| 2011/0248692 A1* | 10/2011 | Shehu | H02M 3/1584 323/272 |
| 2012/0049908 A1* | 3/2012 | Karlsson | H02M 3/157 327/154 |
| 2013/0300392 A1* | 11/2013 | Laur | H02M 3/156 323/284 |
| 2013/0314060 A1* | 11/2013 | Chen | G05F 1/46 323/234 |
| 2014/0002047 A1* | 1/2014 | Houston | H02M 3/156 323/283 |
| 2016/0294278 A1* | 10/2016 | Li | H02M 3/156 |

(Continued)

*Primary Examiner* — Fred E Finch, III

(74) *Attorney, Agent, or Firm* — Michael C. Stephens, Jr.

(57) ABSTRACT

A switching time generation circuit can include: a regulation circuit configured to generate a regulation signal in accordance with change information of an output signal of a switching converter; and the regulation circuit being configured to adjust a switching state of a power switch based on the regulation signal, where the switching converter includes a power stage circuit having the power switch.

20 Claims, 14 Drawing Sheets

(56) References Cited

U.S. PATENT DOCUMENTS

| | | | |
|---|---|---|---|
| 2017/0025952 A1* | 1/2017 | Huang | H02M 3/156 |
| 2017/0318639 A1 | 11/2017 | Wang et al. | |
| 2017/0331373 A1* | 11/2017 | Huang | H02M 1/08 |
| 2018/0013348 A1* | 1/2018 | Paul | H02M 3/1584 |
| 2018/0145577 A1* | 5/2018 | Fan | H02M 3/157 |
| 2018/0191246 A1* | 7/2018 | Chen | H02M 3/156 |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2019/0393783 A1* | 12/2019 | Luo | H02M 1/08 |

* cited by examiner

US 11,075,579 B2

SWITCHING CONVERTER, SWITCHING TIME GENERATION CIRCUIT AND SWITCHING TIME CONTROL METHOD THEREOF

RELATED APPLICATIONS

This application claims the benefit of Chinese Patent Application No. 201810761243.5, filed on Jul. 12, 2018, which is incorporated herein by reference in its entirety.

FIELD OF THE INVENTION

The present invention generally relates to the field of power electronics, and more particularly to switching converters and associated control methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a switching time generation circuit can include: (i) a regulation circuit configured to generate a regulation signal in accordance with change information of an output signal of a switching converter; and (ii) the regulation circuit being configured to adjust a switching state of a power switch based on the regulation signal, where the switching converter includes a power stage circuit having the power switch.

Switching time generation circuits typically have two forms: on-time generation circuits and off-time generation circuits. The constant on-time control (COT) and the constant off-time control (CFT) both belong to pulse frequency modulation (PFM) control methods, in order to control the on-time or off-time of the switches in the switching converter to be constant. As compared to a pulse-width modulation (PWM) control method, COT and CFT can be widely applied to control the switching converter due to the advantages of high efficiency under the light load and rapid dynamic response.

Figure 1:
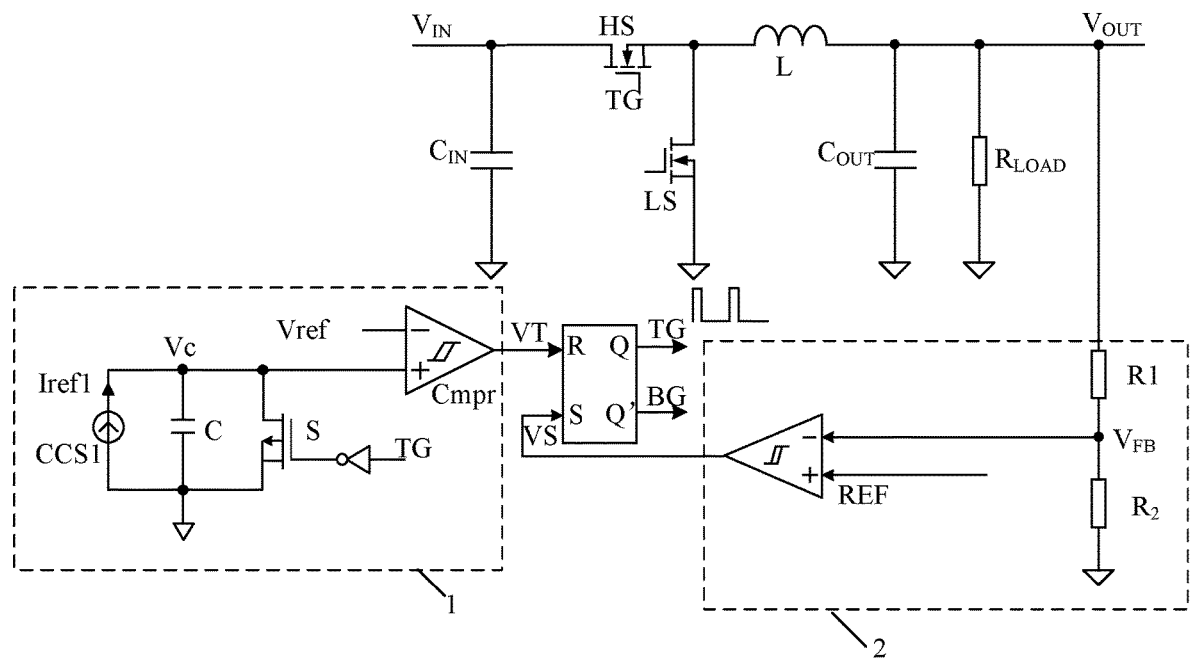
FIG. 1 is a schematic diagram of an example constant on-time control circuit for a buck converter.

Referring now to FIG. 1, shown is a schematic diagram of an example constant on-time control circuit for a buck converter. In this example, the buck converter can include main power switch HS, synchronous power switch LS, and a control circuit. The control circuit can include constant on-time generation circuit 1, an RS flip-flop, and feedback control circuit 2. Control signal VS (e.g., a set signal for the RS flip-flop) can be generated according to feedback signal VFB of the output signal of the buck converter and reference signal REF, in order to turn on main power switch HS. Control signal VT (e.g., a reset signal for the RS flip-flop) may be generated by constant on-time generation circuit 1 after a constant time, in order to turn off main power switch HS. Constant on-time generation circuit 1 can include current source CCS1, capacitor C, and switch S can connect in parallel, in order to generate ramp signal Vc on capacitor C. Switch S can be controlled by an inverted version of drive signal TG, which is the drive signal for main power switch HS.

Figure 2:
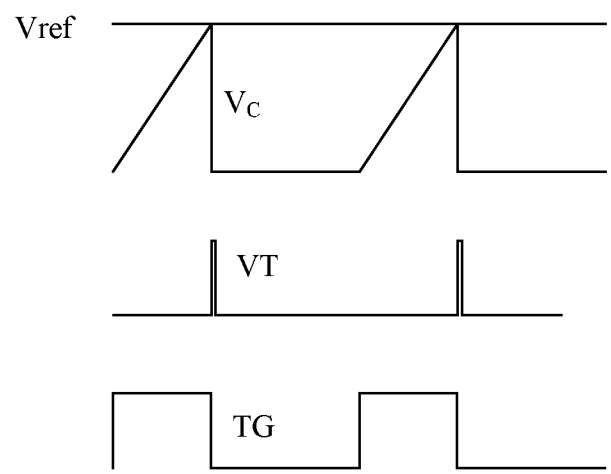
FIG. 2 is a waveform diagram of an example operation of the control circuit in FIG. 1.

Current Iref1 generated by current source CCS1 can be constant, or a current proportional to input signal VIN. Further, constant on-time generation circuit 1 can include comparator Cmpr, having an inverting terminal to receive reference signal Vref, a non-inverting terminal to receive ramp signal Vc, and an output terminal to generate control signal VT. Referring now to FIG. 2, shown is a waveform diagram of example operation of the constant on-time generation circuit in FIG. 1. When drive signal TG is active, switch S is turned off, and then current Iref1 can charge capacitor C, thus ramp signal Vc on capacitor C can be generated. When drive signal TG is inactive, switch S may be turned on, and then capacitor C can be discharged quickly to zero. When ramp signal Vc reaches reference signal Vref, control signal VT is active, such that main power switch HS is turned off.

Figure 3:
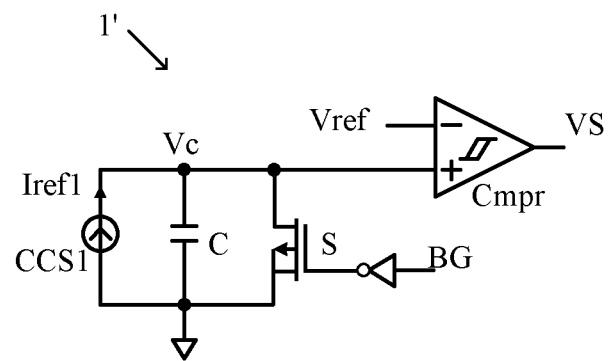
FIG. 3 is a schematic diagram of an example constant off-time generation circuit.
Figure 4:
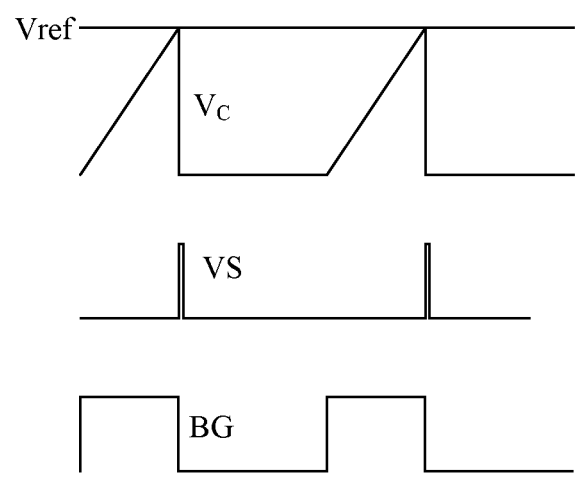
FIG. 4 is a waveform diagram of example operation for the constant off-time generation circuit in FIG. 3.

Referring now to FIGS. 3 and 4, shown are a schematic diagram of an example constant off-time generation circuit and a waveform diagram of example operation for the constant off-time generation circuit in FIG. 3. As compared with constant on-time generation circuit 1 in FIG. 1, in constant off-time generation circuit 1', switch S may be controlled by an inverted signal of drive signal BG that is in reverse phase with drive signal TG. Also, the output terminal of comparator Cmpr can generate control signal VS. When drive signal BG is active, switch S can be turned off, and then current Iref1 can charge capacitor C, thus ramp signal Vc on capacitor C can be generated. When drive signal BG is inactive, switch S is turned on, and then capacitor C can be discharged quickly to zero. When ramp signal Vc reaches reference signal Vref, control signal VS is active, such that drive signal TG is active and main power switch HS may be turned on, as shown in FIG. 4. In this example, control signal VS generated according to feedback signal VFB can control the turn-off time of main power switch HS.

However, under the constant on-time control, when the load suddenly changes from a light load to a heavy load, the response time for turning off main power switch HS may be determined by the response time of the feedback loop circuit. Thus, when the feedback loop response speed is fast enough, the switching converter may be operated under a constant on time and a minimum off time, which greatly limits the response speed of the switching converter, such that output signal $V_{OUT}$ may have a large overshoot. When the load suddenly changes from the heavy load to the light load, the response speed of the load is also limited, thereby resulting in a large drop in output signal $V_{OUT}$. Similarly, under the constant off-time control, the response speed is also limited when the load suddenly changes due to the fixed off time, such that output signal $V_{OUT}$ may have a large overshoot or a large drop.

Figure 5:
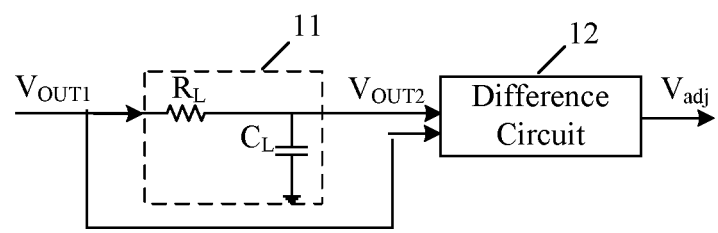
FIG. 5 is a schematic diagram of a first example regulation circuit in accordance with embodiments of the present invention.

Referring now to FIG. 5, shown is a schematic block diagram of a first example regulation circuit in accordance with embodiments of the present invention. This example regulation circuit in a switching time generation circuit may be applied in applications whereby a switching converter may utilize the on-time control and the off-time control. In one example, the switching time generation circuit can include the regulation circuit and an on-time generation circuit, and the regulation circuit can generate regulation signal $V_{adj}$ based on the change information about the output signal of the switching converter to adjust an on-time of a power switch. In another example, the switching time generation circuit can include the regulation circuit and an off-time generation circuit, and the regulation circuit can generate regulation signal $V_{adj}$ based on the change information about the output signal of the switching converter to adjust an off-time of the power switch. In this way, the switching state of the power switch in the switching converter can be quickly adjusted based on regulation signal $V_{adj}$ when the load changes suddenly. For example, the switching converter can be a buck converter, as shown in FIG. 1.

In this example, the regulation circuit can include conditioning circuit 11 and difference circuit 12. Conditioning circuit 11 can be implemented by a low-pass filter, including resistor $R_L$ and capacitor $C_L$ connected in series between an input terminal of conditioning circuit 11 and ground. Conditioning circuit 11 can receive output signal $V_{OUT1}$, which can characterize the output signal of the switching converter (e.g., proportional to the output signal), and may generate output signal $V_{OUT2}$. When output signal $V_{OUT1}$ suddenly changes, output signal $V_{OUT2}$ may not follow the change immediately, but can remain in the state before the sudden change of output signal $V_{OUT1}$ occurs. Difference circuit 12 can receive output signals $V_{OUT1}$ and $V_{OUT2}$, and may generate regulation signal $V_{adj}$ according to the difference between output signals $V_{OUT1}$ and $V_{OUT2}$, where $V_{adj}$=k($V_{OUT2}$-$V_{OUT1}$). In this example, the effect of reducing the overshoot or drop of the output signal may be determined by the time constant of the low-pass filter. The larger time constant of the low-pass filter corresponds to a better effect of reducing the overshoot or drop of the output signal, but the system volume may increase, such that the parameters of the low-pass filter can be set according to particular applications. It should be understood that the low-pass filter may be implemented in any other form with a low-pass filtering function.

Figure 6:
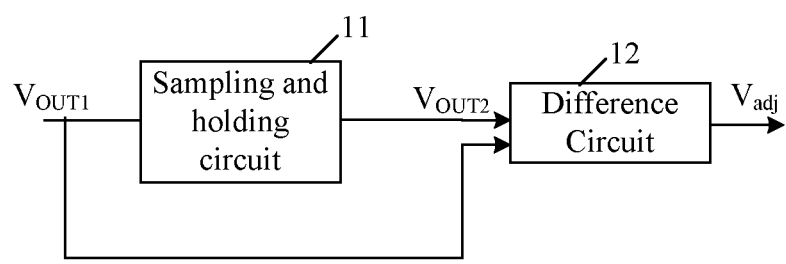
FIG. 6 is a schematic diagram of a second example regulation circuit in accordance with embodiments of the present invention.

Referring now to FIG. 6, shown is a schematic block diagram of a second example regulation circuit in accordance with embodiments of the present invention. As compared with FIG. 5, conditioning circuit 11 can include a sample-and-hold circuit. It should be understood that the sample-and-hold circuit may be any circuit structure or generated by digital control. Conditioning circuit 11 can sample output signal $V_{OUT1}$ and hold for a period of time before generating output signal $V_{OUT2}$. The holding time can be adjusted according to circuit applications. Similarly, output signal $V_{OUT2}$ may remain in the state before the sudden change of output signal $V_{OUT1}$ occurs. Also, when the output signal of the switching converter approaches an expected value, regulation signal $V_{adj}$ may no longer adjust the switching state of the switch in the switching converter.

It should be understood that conditioning circuit 11 may also be implemented by the sample-and-hold circuit coupled in series with the low pass filter. When the low-pass filter has the same size as the low-pass filter in FIG. 5, the time that output signal $V_{OUT2}$ remains in the state before the sudden change of output signal $V_{OUT1}$ may be longer due to the sample-and-hold circuit, and the adjustment effect may be improved. In other words, in order to achieve the same effect with the first example, the values of the resistor and capacitor of the low-pass filter can be reduced due to the sample-and-hold circuit, thereby reducing the size of the low-pass filter.

Figure 7:
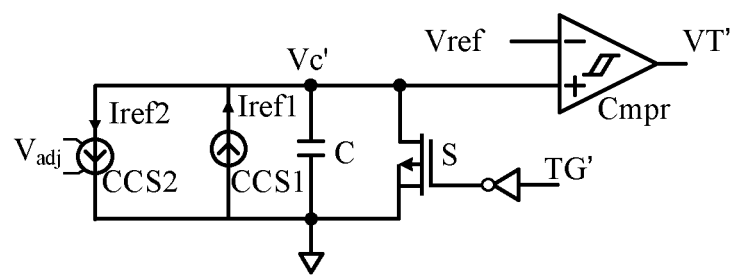
FIG. 7 is a schematic diagram of a first example on-time generation circuit in accordance with embodiments of the present invention.

Referring now to FIG. 7, shown is a schematic diagram of a first example on-time generation circuit in accordance with embodiments of the present invention. In this example, current source CCS2 can be included in the on-time generation circuit, which may be controlled by regulation signal $V_{adj}$, in order to generate current Iref2 to adjust the on-time of main power switch HS. Regulation signal $V_{adj}$ may be generated by any of the methods shown in FIGS. 5 and 6, or by other circuits having the same or similar functionality.

Current source CCS2 can connect in parallel with current source CCS1, and the reference directions of currents Iref1 and Iref2 are opposite. Similarly, switch S can be controlled by the inverted version of drive signal TG' for main power switch HS. It should be understood that the on-time generation circuit may have other connection forms to realize the same or similar functionality.

Figure 8:
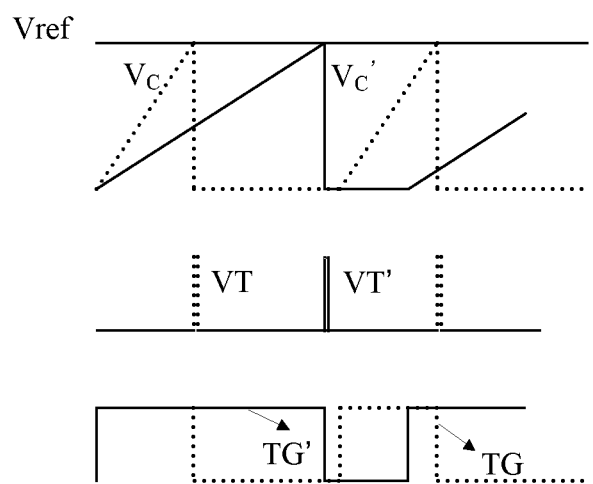
FIG. 8 is a waveform diagram of example operation of the first example on-time generation circuit during load transient in accordance with embodiments of the present invention.

Referring now to FIG. 8, shown is a waveform diagram of example operation of the first example on-time generation circuit before and after the load changes from light load to heavy load, in accordance with embodiments of the present invention. The solid line refers to the condition after the change of the load, and the dotted line refers to the condition before the change of the load. When the load changes from a light load to a heavy load, output signal $V_{OUT1}$ may instantaneously decrease, and output signal $V_{OUT2}$ can remain in the state before the change of output signal $V_{OUT1}$ at this instant, and has not changed, such that the difference between output signals $V_{OUT2}$ and $V_{OUT1}$ is positive. That is, regulation signal $V_{adj}$ is positive and thus the direction of current Iref2 may be opposite to the direction of current Iref1. Therefore, the charging current (e.g., Iref1−Iref2) for charging capacitor C can decrease, and thus the slope of ramp signal Vc' may become smaller than the slope of ramp signal Vc before the change of the load, as shown in FIG. 8. Since reference signal Vref is constant, the time period during which ramp signal Vc' reaches reference signal Vref may become longer, and the time when control signal VT' generated by comparator Cmpr is active can lag behind the time when control signal VT is active.

That is, the time when main power switch HS is turned off can be delayed. Thus, the conduction time of main power switch HS may increase after the change of the load. In this way, the output signal of the switching converter can gradually increase to the expected value, output signal $V_{OUT1}$ can correspondingly increase, and output signal $V_{OUT2}$ can also gradually approach to output signal $V_{OUT1}$, such that regulation signal $V_{adj}$ can become small, and the time when control signal VT' is active may not be changed substantially. As shown in FIG. 8, the high level duration of drive signal TG' after the load change may be longer than the high level duration of drive signal TG before the load change. Thus, the overshoot of the output signal can be reduced, and the dynamic response speed may be improved.

Similarly, when the load changes from a heavy load to a light load, output signal $V_{OUT1}$ may increase instantaneously while output signal $V_{OUT2}$ has not changed at that moment, such that the difference between output signals $V_{OUT2}$ and $V_{OUT1}$ is negative; that is, regulation signal $V_{adj}$ is negative. Thus, current Iref2 may be in the same direction as current Iref1, thereby increasing the charging current of capacitor C. Since reference signal Vref1 remains unchanged, the conduction time of main power switch HS can be decreased, thereby reducing the drop of the output signal and improving the dynamic response speed.

Figure 9:
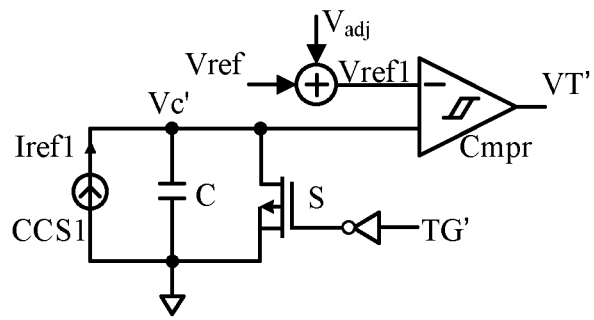
FIG. 9 is a schematic diagram of a second example on-time generation circuit in accordance with embodiments of the present invention.

Referring now to FIG. 9, shown is a schematic diagram of a second example on-time generation circuit in accordance with embodiments of the present invention. In this particular example, regulation signal $V_{adj}$ can be superimposed on reference signal Vref, where regulation signal $V_{adj}$ equals $k(V_{OUT2}-V_{OUT1})$, as described above.

Figure 10:
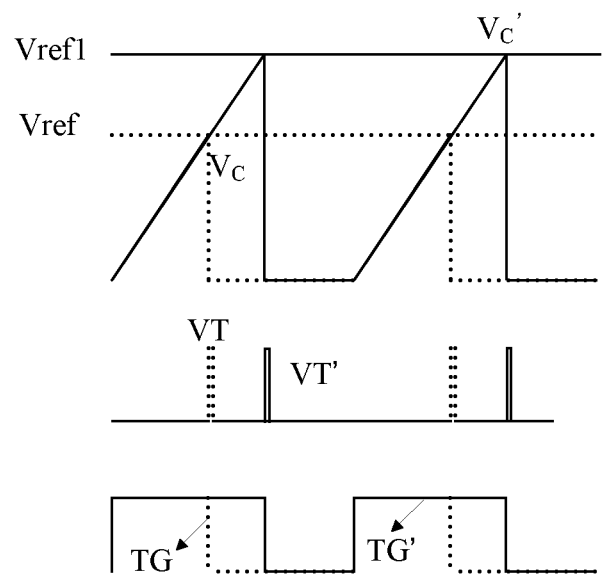
FIG. 10 is a waveform diagram of example operation of the second example on-time generation circuit during load transient in accordance with embodiments of the present invention.

Referring now to FIG. 10, shown is a waveform diagram of example operation of the second example on-time generation circuit before and after the load changes from a light load to a heavy load, in accordance with embodiments of the present invention. The solid line refers to the condition after the change the load, and the dotted line refers to the condition before the change of the load. In this particular example, when the load changes from light load to heavy load, output signal $V_{OUT1}$ may instantaneously decrease, and output signal $V_{OUT2}$ can remain in the state before the change of output signal $V_{OUT1}$ at this instant, and has not changed, such that regulation signal $V_{adj}$ is positive. Thus, reference signal Vref1, which is equal to Vref+$V_{adj}$, can increase.

As shown in FIG. 10, reference signal Vref1 is greater than reference signal Vref. Since reference signal Vref is constant, the time period during which ramp signal Vc' reaches reference signal Vref1 can become longer, such that the time when control signal VT' generated by comparator Cmpr is active may lag behind the time when control signal VT is active. That is, the time when main power switch HS is turned off can be delayed. Thus, the conduction time of main power switch HS may increase after the change of the load. Correspondingly, the high level duration of drive signal TG' after the change of the load is longer than the high level duration of drive signal TG before the change of the load. Thus, the overshoot of the output signal of the switching converter may be reduced, and the dynamic response speed improved. Similarly, when the load changes from a heavy load to a light load, output signal $V_{OUT1}$ can increase instantaneously while output signal $V_{OUT2}$ has not changed at that moment, such that regulation signal $V_{adj}$ is negative. Therefore, the conduction time of main power switch HS can be decreased, thereby reducing the drop of the output signal of the switching converter and improving the dynamic response speed.

Figure 11:
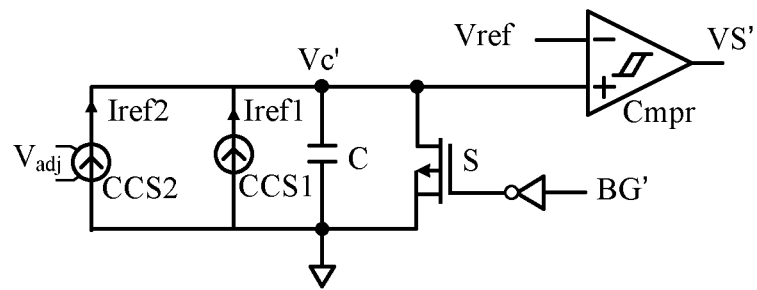
FIG. 11 is a schematic diagram of a first example off-time generation circuit in accordance with embodiments of the present invention.

Referring now to FIG. 11, shown is a schematic diagram of a first example off-time generation circuit in accordance with embodiments of the present invention. In this particular example, current source CCS2 can be included in the off-time generation circuit, which is controlled by regulation signal $V_{adj}$, in order to generate current Iref2, which is equal to $k(V_{OUT2}-V_{OUT1})$, in order to adjust the off-time of main power switch HS. Regulation signal $V_{adj}$ may be generated by any of the methods shown in FIGS. 5 and 6, or by other circuits having the same or similar functionality. Current source CCS2 can connect in parallel with current source CCS1, and the reference directions of current Iref1 and current Iref2 may be the same. Similarly, switch S can be controlled by the inverted signal of drive signal BG' for synchronous power switch LS, which is in reverse phase with drive signal TG' for main power switch HS. It should be understood that the off-time generation circuit may have other connection forms to realize the same or similar functionality.

Figure 12:
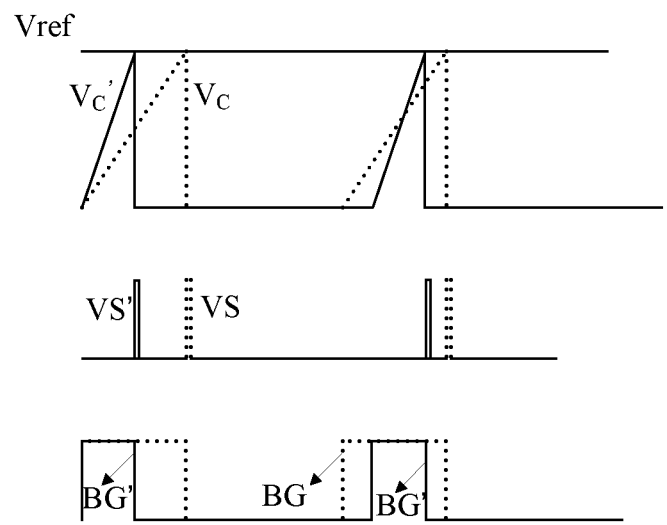
FIG. 12 is a waveform diagram of example operation of the first example off-time generation circuit during load transient in accordance with embodiments of the present invention.

Referring now to FIG. 12, shown is a waveform diagram of example operation of the first example off-time generation circuit before and after the load changes from light load to heavy load, in accordance with embodiments of the present invention. The solid line refers to the condition after the change of the load, and the dotted line refers to the condition before the change of the load. When the load changes from light load to heavy load, output signal $V_{OUT1}$ can instantaneously decrease, and output signal $V_{OUT2}$ may remain in the state before the change of output signal $V_{OUT1}$ at this moment, and has not changed, such that the difference between output signals $V_{OUT2}$ and $V_{OUT1}$ is positive. That is, regulation signal $V_{adj}$ may be positive, and thus the direction of current Iref2 may be the same as the direction of current Iref1.

Therefore, the charging current (e.g., Iref1+Iref2) for charging capacitor C can increase, and thus the slope of ramp signal Vc' becomes greater than the slope of ramp signal Vc. Since reference signal Vref is constant, the time period during which ramp signal Vc' reaches reference signal Vref can become shorter, and the time when control signal VS' generated by comparator Cmpr is active can be ahead of the time when control signal VS is active. That is, the time when main power switch HS is turned on can be advanced. Thus, the off-time of main power switch HS may decrease after the change of the load. As shown in FIG. 12, the high level duration of drive signal BG' after the load change may be shorter than the high level duration of drive signal BG before the load change. Thus, the overshoot of the output signal of the switching converter can be reduced, and the dynamic response speed may be improved.

Similarly, when the load changes from a heavy load to a light load, output signal $V_{OUT1}$ may increase instantaneously while output signal $V_{OUT2}$ has not changed at this moment, such that the difference between output signals $V_{OUT2}$ and $V_{OUT1}$ is negative; that is, regulation signal $V_{adj}$ is negative. Thus, current Iref2 may be in the opposite direction to current Iref1, thereby decreasing the charging current of capacitor C. Since reference signal Vref1 may remain unchanged, the off-time of main power switch HS can be increased, thereby reducing the drop of the output signal and improving the dynamic response speed.

Figure 13:
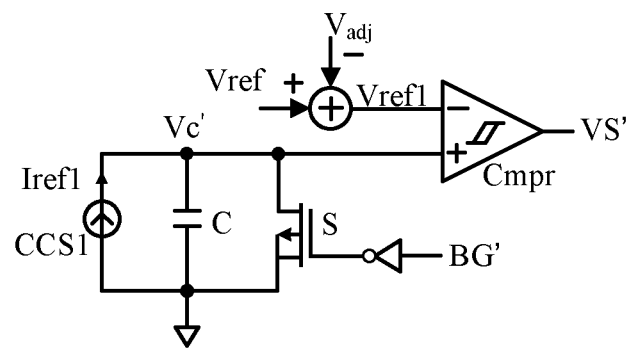
FIG. 13 is a schematic diagram of a second example off-time generation circuit in accordance with embodiments of the present invention.

Referring now to FIG. 13, shown is a schematic diagram of a second example off-time generation circuit in accordance with embodiments of the present invention. In this particular example, regulation signal $V_{adj}$ may be reversely superimposed on reference signal Vref to generate reference signal Vref1 that equals Vref–$V_{adj}$, where regulation signal $V_{adj}$ equals k(VOUT2–VOUT1), as described above.

Figure 14:
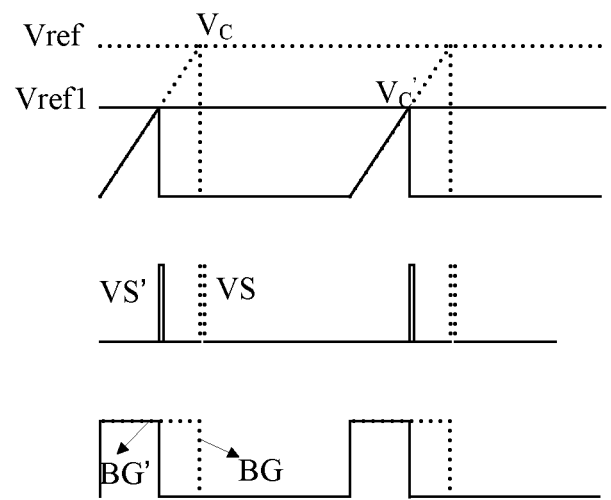
FIG. 14 is a waveform diagram of example operation of the second example off-time generation circuit during load transient in accordance with embodiments of the present invention.

Referring now to FIG. 14, shown is a waveform diagram of example operation of the second example off-time generation circuit before and after the load changes from light load to heavy load, in accordance with embodiments of the present invention. The solid line refers to the condition after the change of the load, and the dotted line refers to the condition before the change of the load. In this particular example, when the load changes from a light load to a heavy load, output signal $V_{OUT1}$ can instantaneously decrease, and output signal $V_{OUT2}$ may remain in the state before the change of output signal $V_{OUT1}$ at this moment, and has not changed, such that regulation signal $V_{adj}$ is positive. Thus, reference signal Vref1 can decrease.

As shown in FIG. 14, reference signal Vref1 is less than reference signal Vref before the change of the load. Since reference signal Vref is constant, the time period during which ramp signal Vc' reaches reference signal Vref1 can become shorter, such that the time when control signal VS' generated by comparator Cmpr is active can be ahead of the time when control signal VS is active. That is, the time when main power switch HS is turned off can be advanced. Thus, the off-time of main power switch HS may decrease after the change of the load. Correspondingly, the high level duration of drive signal BG' after the change of the load may be smaller than the high level duration of drive signal BG before the change of the load change. The high level duration of drive signal BG can represent the off-time of main power switch HS since drive signal BG is logically in anti-phase with drive signal TG of main power switch HS. Thus, the overshoot of the output signal of the switching converter may be reduced, and the dynamic response speed improved.

Similarly, when the load changes from a heavy load to a light load, output signal $V_{OUT1}$ may increase instantaneously while output signal $V_{OUT2}$ has not changed at that moment, such that regulation signal $V_{adj}$ is negative. Therefore, the off-time of main power switch HS can be increased, and the duty cycle of drive signal TG' can be reduced correspondingly, thereby reducing the drop of the output signal and improving the dynamic response speed. It should be understood that the conditioning circuit of particular embodiments may include any circuit having the above-mentioned function of keeping the second output signal unchanged when the first output signal suddenly changes, such as a delay circuit, such that when the first output signal changes, the second output signal is maintained in a state before the first output signal changes until the output signal is equal to the expected value.

It should also be understood by those skilled in the art that the regulation circuit of particular embodiments can also be used to generate the regulation signal to change the on-time and off time of the main power switch when the variation amplitude of the load exceeds a certain level. That is, when the variation amplitude of the output signal of the switching converter is greater than a predetermined threshold. For example, based on the example shown in FIG. 5, if the difference between the output signal sampled at present and the output signal sampled at the previous time is greater than the predetermined threshold, the active level length of the drive signal can be adjusted according to regulation signal $V_{adj}$, thereby changing the on time or off time of main power switch HS and synchronous power switch LS.

If the difference between the output signal sampled at present and the output signal sampled at the previous time is less than the predetermined threshold, regulation signal $V_{adj}$ cannot be used to adjust the active level length of the drive signal, and the on time or off time of main power switch HS and synchronous power switch LS can be maintained as constant. It should be understood that the output signal sampled at present may also be directly compared with the expected value of the output signal. The circuit for determining that the variation amplitude of the output signal is greater than the predetermined threshold may be formed in any form of analog or digital manner, and may include, for example, a sample and hold circuit, a comparison circuit, an AND circuit, and the like.

The switching time generation circuit for a switching converter and a switching time control method thereof are provided in particular embodiments. By changing the time when control signal for the power switch becomes active according to the regulation signal generated based on the change information about the output signal of the switching converter, the switching state of the power switch in the switching converter can be quickly adjusted when the load changes suddenly, thereby reducing the overshoot or drop of the output signal and improving the dynamic response.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switching time generation circuit, comprising:
   a) a regulation circuit configured to generate a regulation signal that is directly proportional to a difference between an output signal of a switching converter as obtained at two different time points, wherein the output signal is directly proportional to a load voltage of the switching converter; and
   b) the regulation circuit being configured to adjust a switching state of a power switch based on the regulation signal, wherein the switching converter comprises a power stage circuit having the power switch.

2. The switching time generation circuit of claim 1, wherein an active level length of a drive signal for driving the power switch is adjusted in accordance with the regulation signal.

3. The switching time generation circuit of claim 1, wherein:
a) when variation amplitude of the output signal is greater than a predetermined threshold, an active level length of a drive signal for driving the power switch is adjusted in accordance with the regulation signal; and
b) when the variation amplitude of the output signal is less than the predetermined threshold, the active level length of the drive signal is maintained as constant.

4. The switching time generation circuit of claim 1, wherein the regulation circuit comprises a conditioning circuit configured to receive a first output signal for characterizing the output signal of the switching converter and to generate a second output signal, wherein following a transient change in the first output signal, the second output signal maintains in the state of the first output signal from immediately before the transient change.

5. The switching time generation circuit of claim 4, wherein the conditioning circuit comprises a low-pass filter configured to filter the first output signal in order to generate the second output signal.

6. The switching time generation circuit of claim 4, wherein the conditioning circuit comprises a sample-and-hold circuit that is configured to sample the first output signal and hold for a period of time in order to generate the second output signal.

7. The switching time generation circuit of claim 4, wherein the conditioning circuit further comprises a difference circuit configured to generate the regulation signal in accordance with the first and second output signals.

8. The switching time generation circuit of claim 1, further comprising:
a) a ramp signal generation circuit configured to generate a ramp signal; and
b) a comparator configured to generate a control signal to control the switching state of the power switch, in accordance with a reference signal and the ramp signal.

9. The switching time generation circuit of claim 8, wherein the reference signal is adjusted in accordance with the regulation signal to adjust a time when the control signal is active.

10. The switching time generation circuit of claim 8, wherein the ramp signal generation circuit comprises a second current source coupled with a first current source in parallel, and being configured to generate a second current based on the regulation signal to adjust the ramp signal, thereby changing a time when the control signal is active.

11. A switching time control method for a switching converter, the method comprising:
a) generating a regulation signal that is directly proportional to a difference between an output signal of a switching converter as obtained at two different time points, wherein the output signal is directly proportional to a load voltage of the switching converter; and
b) adjusting a switching state of a power switch in accordance with the regulation signal wherein the switching converter comprises a power stage circuit having the power switch.

12. The method of claim 11, wherein an active level length of a drive signal for driving the power switch is adjusted in accordance with said regulation signal.

13. The method of claim 12, wherein the greater variation amplitude of the output signal, the greater variation amplitude of the active level length of the drive signal.

14. The method of claim 11, further comprising:
a) adjusting an active level length of the drive signal in accordance with the regulation signal when variation amplitude of the output signal is greater than a predetermined threshold; and
b) maintaining the active level length of the drive signal when the variation amplitude of the output signal is less than the predetermined threshold.

15. The method of claim 11, further comprising sampling the output signal at the two different time points.

16. The method of claim 11, further comprising:
a) generating a first output signal for characterizing the output signal;
b) generating a second output signal in accordance with the first output signal, wherein following a transient change in the first output signal, the second output signal maintains in the state of the first output signal from immediately before the transient change; and
c) obtaining the regulation signal in accordance with a difference between the second output signal and the first output signal.

17. The method of claim 11, further comprising:
a) filtering the output signal to generate a second output signal; and
b) generating the regulation signal in accordance with a difference between the second output signal and the output signal.

18. The method of claim 11, further comprising:
a) sampling and holding, by a sample-and-hold circuit, the output signal at a moment to generate a second output signal; and
b) generating the regulation signal in accordance with a difference between the second output signal and the output signal.

19. The method of claim 11, further comprising:
a) adjusting a reference signal in accordance with the regulation signal to generate a first reference signal; and
b) adjusting the switching state of the power switch in accordance with comparison between the first reference signal and a ramp signal.

20. The method of claim 11, further comprising:
a) adjusting a ramp signal in accordance with the regulation signal; and
b) adjusting the switching state of the power switch in accordance with a comparison between a first reference signal and the ramp signal.

* * * * *